No. 829,591. PATENTED AUG. 28, 1906.
G. W. LIBBY.
NUT LOCK.
APPLICATION FILED AUG. 23, 1905.

Witnesses: Inventor.

UNITED STATES PATENT OFFICE.

GEORGE W. LIBBY, OF PORTLAND, MAINE.

NUT-LOCK.

No. 829,591.　　　　Specification of Letters Patent.　　　　Patented Aug. 28, 1906.

Application filed August 23, 1905. Serial No. 275,500.

*To all whom it may concern:*

Be it known that I, GEORGE W. LIBBY, a citizen of the United States, residing at Portland, in the county of Cumberland and State of Maine, have invented an Improvement in Nut-Locks; and I hereby declare that the following is a full, clear, and exact description of the invention, which will enable others skilled in the art to which it appertains to make and use the same.

My invention relates to improvements in nut-locks.

The object of my invention is to provide a device for locking nuts on bolts which shall be not only simple and effective, but also employ such means for the connection of the parts as to avoid their separation or loss.

Figure 1:
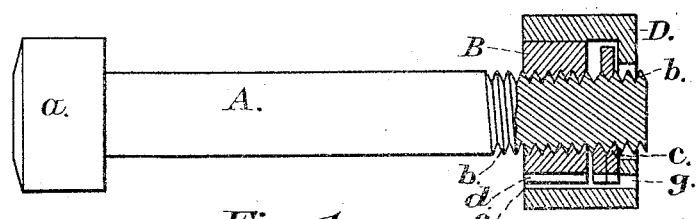
Figures 2, 3, 4:
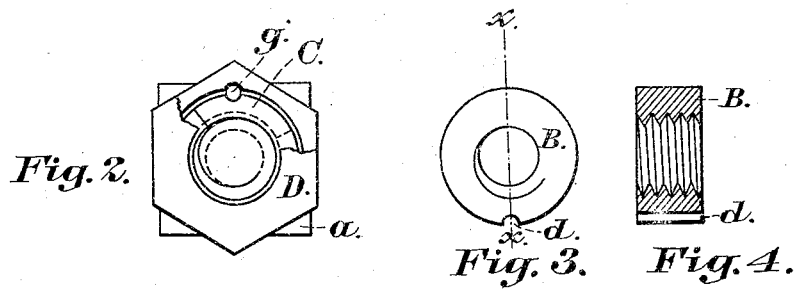
Figures 5, 6, 7, 8:
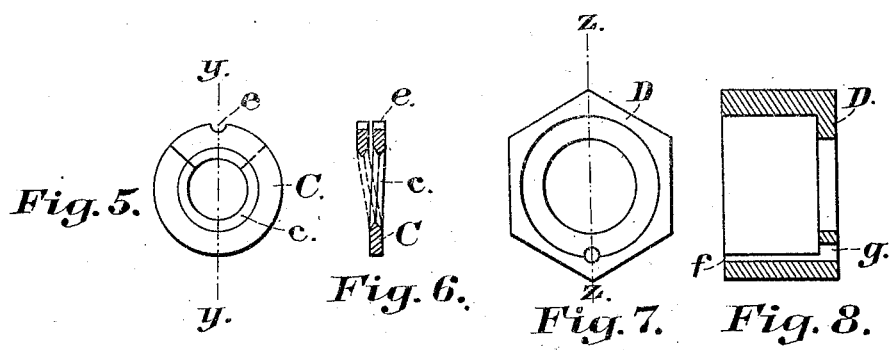

In the drawings, Figure 1 is a side elevation of a bolt and head with the threaded portion of the bolt and nut in vertical longitudinal section. Fig. 2 is a top plan of the cap with a portion broken out. Fig. 3 is a top plan of the nut. Fig. 4 is a vertical longitudinal section of the nut on the line $x\ x$ of Fig. 3. Fig. 5 is a top plan of the nut-lock. Fig. 6 is a transverse section of the same on the line $y\ y$ of Fig. 5. Fig. 7 is a plan of the under side of the nut and cap, and Fig. 8 is a vertical longitudinal section of the cap on the line $z\ z$ of Fig. 7.

The bolt A shown in the drawings is of ordinary construction, having a head $a$ and screw-thread $b$ at the other end. The nut B is also of the usual construction, except that its outer circumference is preferably circular rather than square or many-sided. It is provided within with a screw-thread adapted to receive the screw-thread $b$ of the bolt. Upon the side the nut is provided with a semicircular groove $d$. (See Figs. 1, 3, and 4.) The nut-lock C consists of a spiral the interior edge of which, $c$, is made to conform in shape to the thread $b$ of the bolt A. It is provided also with a semicircular groove $e$ in the side similar to the groove $d$ of the nut B and so placed and of such size as to register with the groove $d$. The ends of the nut-lock C overlap each other to the extent of about ninety degrees, as shown in Fig. 5, and, as will be observed by reference to Figs. 1 and 6 of the drawings, the faces of these ends are substantially parallel and in contact with each other. The cap D is shown in Figs. 1, 2, 7, and 8. The exterior sides may be either square, hexagonal, or octagonal. The interior is provided with a circular aperture extending nearly to the top and of nearly the same diameter as the exterior diameter of the nut B. This aperture extends to the top of the cap, which top is provided with an aperture slightly larger than the diameter of the nut. In one side of the interior wall is a semicircular groove $f$, preferably of the same diameter as the grooves $d$ and $e$ in the nut and nut-lock and terminating in the aperture $g$ through the head of the cap. (See Figs. 1 and 2.) The parts being constructed as described, the cap D is heated and shrunk over the nut B, (the groove $d$ of the nut being placed opposite the groove $f$ of the cap, so as to form a continuous aperture which will register with the opening $g$,) inclosing the nut-lock C between the top of the nut and the under side of the top of the cap D, thus securing all the parts together, but leaving the nut-lock C free to move independently of the other parts.

It is believed that the operation of the device is obvious. It being desired to place the nut in position upon a bolt, a pin is inserted through the aperture $g$ and through the circular aperture formed by the groove $f$ on the one side and the groves $d$ and $e$ of the nut and nut-lock on the other side and the nut then turned onto the bolt in the usual manner. The pin is now withdrawn and the nut is securely locked upon the bolt, slight motion only being permissible, not exceeding generally a quarter of a turn either way. The degree of such motion depends upon the amount of space between the top and bottom of the nut-lock and the under side of the cap and the top of the nut, respectively. The nut is thus locked upon the bolt, because if it is attempted to turn the nut off from the bolt or by jar it works up against the nut-lock the contact between the upper surface of the nut and the overlapping portions of the nut-lock presses these overlapping portions together, the more closely the greater the force, thus causing the inner edges of the overlapping portions to grasp and bind the thread of the bolt between them, which effectually prevents the turning of the nut-lock. The nut-lock being constructed of thin steel has a tendency to grasp the bolt and to maintain the position in which it is left when the pin is withdrawn, and the pressure of the overlapping portions of the nut-lock against each other and upon the thread of the bolt is effected by the contact of the upper surface of the nut against the nut-lock when it is attempted to turn off the nut or by the under surface of the upper end of the cap D against the upper surface of said overlapping portions when it is attempted to turn the nut farther onto the bolt, the maximum pressure attainable being obtained in about one-quarter revolution of the nut in either case, as above stated.

If it is desired to remove the nut, the cap D is turned (carrying with it the nut B) to such an extent that the aperture $g$ registers with the aperture formed by the grooves $f$, $d$, and $e$, when the pin is inserted and the nut removed in the ordinary manner. In case attempt is made to forcibly remove the nut without connecting the nut and nut-lock by the pin stripping the thread of the bolt is prevented by reason of the support afforded by the lower end of the nut-lock to the upper end of the nut B, (see Fig. 1,) the upper surface of the nut coming in contact with the lower surface of the nut-lock.

In the event that the parts bolted together are desired to be closely held and without any play the space between the top of the nut and the bottom of the head of the cap should be only slightly greater than the thickness of the two ends of the nut-lock.

The cap D does not prevent the separation of the parts, but protects both nut and nut-lock from injury.

Additional or other means may be used for connecting the cap D with the nut B—as, for instance, when the cap is shrunk hot upon the nut a lip and groove may be provided in the respective parts, or they may be cold-pressed together, or a pin or pins may effect the connection.

What I claim is—

1. The combination of a nut and nut-lock and an inclosing cap fixed to said nut and leaving said nut-lock normally free, together with means whereby said nut and inclosing cap and the nut-lock may be at will connected so as to insure the movement of said parts together, substantially as described.

2. The combination of a nut and nut-lock and an inclosing cap fixed to said nut and leaving said nut-lock normally free, together with registering apertures, a key adapted to enter said apertures whereby said cap and nut and said nut-lock may be so connected as to insure the movement of said parts together, substantially as described.

In testimony that I claim the foregoing as my invention I have hereunto set my hand this 10th day of August, A. D. 1905.

GEORGE W. LIBBY.

In presence of—
 GEO. E. BIRD,
 A. C. BERRY.